US012634804B2

(12) United States Patent
Li

(10) Patent No.: US 12,634,804 B2
(45) Date of Patent: May 19, 2026

(54) COMMUNICATION METHODS, AND USER EQUIPMENT

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 387 days.

(21) Appl. No.: 18/265,407

(22) PCT Filed: Dec. 7, 2020

(86) PCT No.: PCT/CN2020/134365
§ 371 (c)(1),
(2) Date: Jun. 5, 2023

(87) PCT Pub. No.: WO2022/120544
PCT Pub. Date: Jun. 16, 2022

(65) Prior Publication Data
US 2024/0040477 A1     Feb. 1, 2024

(51) Int. Cl.
*H04W 48/08*     (2009.01)
*H04W 48/02*     (2009.01)
*H04W 48/16*     (2009.01)

(52) U.S. Cl.
CPC ........... *H04W 48/08* (2013.01); *H04W 48/02* (2013.01); *H04W 48/16* (2013.01)

(58) Field of Classification Search
None
See application file for complete search history.

(56) References Cited

U.S. PATENT DOCUMENTS

2010/0130215 A1*  5/2010  Jung ..................... H04W 48/02
                                                            455/450
2016/0150462 A1*  5/2016  Yang ..................... H04W 48/08
                                                            370/254
2020/0245224 A1   7/2020  Agiwal
2023/0180110 A1*  6/2023  Kim ..................... H04W 48/02
                                                            370/329

FOREIGN PATENT DOCUMENTS

CN        111918359 A    11/2020
WO    WO 2020122247 A1    6/2020

OTHER PUBLICATIONS

PCT/CN2020/134365, English translation of International Search Report dated Aug. 31, 2021, 2 pages.
(Continued)

*Primary Examiner* — Hong S Cho
(74) *Attorney, Agent, or Firm* — Cozen O'Connor

(57)     ABSTRACT

A method for communication includes a radio access network (RAN) providing a first-type user equipment (UE) with a parameter indicating whether access is allowed. Another method for communication includes: in response to a first-type UE failing to listen to a master information block (MIB) or listening to a cell bar identity in the MIB being cell barred, performing by the first-type UE, cell reselection according to a cell reselection mode of a second-type UE or according to a set mode. The methods may be applied to a reduced capability UE (NR-lite or Redcap UE for short).

15 Claims, 2 Drawing Sheets

301 in response to the first-type UE failing to listen to a master information block (MIB) or listening to a cell bar identity in the MIB being cell barred, performing cell reselection according to a cell reselection mode of a second-type UE or according to a set mode

(56) References Cited

OTHER PUBLICATIONS

Huawei "Summary of offline 110—Identification and access restriction", 3GPP TSG-RAN WG2 Meeting#111-e, R2-2008192, Aug. 2020, 19 pages.
Chinese Patent Application No. 202080003906.2 Office Action dated Aug. 3, 2022, 9 pages.
Chinese Patent Application No. 202080003906.2 English translation of Office Action dated Aug. 3, 2022, 9 pages.
Oppo, "Discussion on RedCap UE's identification and access control", 3GPP TSG-RAN WG2 Meeting #111-e, R2-2006786, Aug. 2020, 2 pages.
European Patent Application No. 20964491.3, partial Search and Opinion dated Dec. 12, 2023, 18 pages.
Sharp "Identification and access restriction for reduced capability UEs" 3GPP TSG RAN WG1 Meeting #103-e, R1-2008397, Oct.-Nov. 2020, 3 pages.
Nokia et al. "Framework and Principles for Reduced Capability Devices" 3GPP TSG-RAN WG1 #102-e, R1-2005528, Aug. 2020, 5 pages.
ZTE Corporation et al. "Further consideration on Redcap UE Identification and Access Control" 3GPP TSG-RAN WG2 Meeting #112 electronic, R2-2009249, Nov. 2020, 4 pages.
ZTE Corporation "Redcap UE identification and access control" 3GPP TSG-RAN WG2 Meeting #111 electronic, R2-2006904, Aug. 2020, 4 pages.
Nokia et al. "Initial access for RedCap UEs" 3GPP TSG-RAN WG1 Meeting #103-e, R1-20008072, Oct.-Nov. 2020, 6 pages.
European Patent Application No. 20964491.3, Search and Opinion dated Feb. 23, 2024, 20 pages.
Ericsson "Corrections to cell barred handing" 3GPP TSG-RAN2 Meeting #110e, R2- 2004852, Jun. 2020, 3 pages.
Samsung "Cell Barring in NR-U" 3GPP TSG-RAN2 107, R2-1908803,Aug. 2019, 3 pages.

* cited by examiner

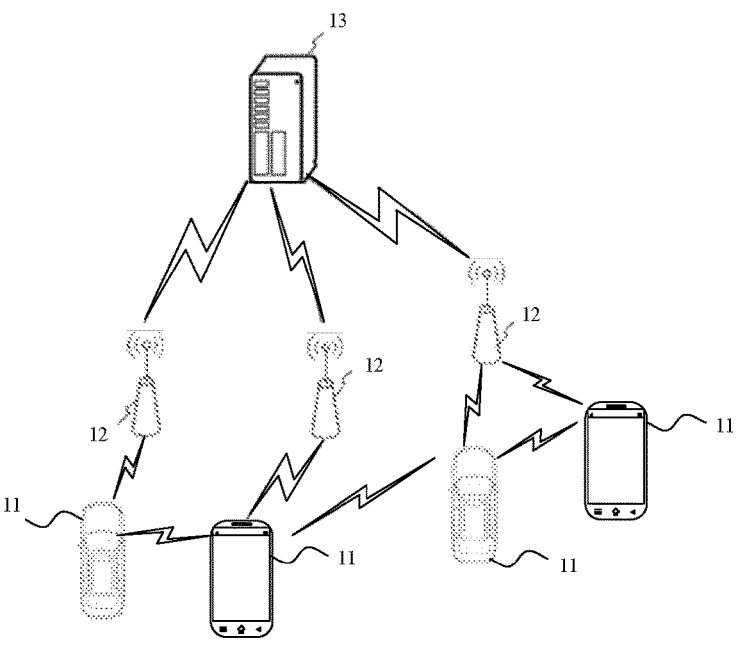

| | 201 |
|---|---|
| providing by a radio access network (RAN), a parameter of whether access is allowed to a first-type user equipment (UE) | |

| | 301 |
|---|---|
| in response to the first-type UE failing to listen to a master information block (MIB) or listening to a cell bar identity in the MIB being cell barred, performing cell reselection according to a cell reselection mode of a second-type UE or according to a set mode | |

FIG. 3

--- apparatus for communication providing unit 40

FIG. 4

--- apparatus for communication listening unit 50 reselection unit 51

FIG. 5

COMMUNICATION METHODS, AND USER EQUIPMENT

CROSS-REFERENCE TO RELATED APPLICATION

This application is the U.S. national phase application of International Application No. PCT/CN2020/134365, filed on Dec. 7, 2020, the entire disclosure of which is incorporated herein by reference.

TECHNICAL FIELD

The disclosure relates to a method and an apparatus for communication, a radio access network and a storage medium.

BACKGROUND

According to the $5^{th}$ Generation new radio (NR) communication network protocol, a cell access identity (i.e., cellbar) is maintained in a master information block (MIB) to control whether a user equipment (UE) is barred from accessing a cell. Other parameters stored in the MIB include an intra-frequency reselection identity (i.e., intraFreqReselection) for controlling the UE to determine whether reselection to neighbor cells on the same frequency as the cell is allowed if the cellbar for the cell is configured in the MIB.

In the current 3GPP standardization, a new type UE is proposed called reduced capability UE (NR-lite or Redcap UE for short). With the introduction of the Redcap UE, it is also necessary to consider functions such as cellbar processing to the Redcap UE and cell reselection after barring, just like common UEs in NR. Currently, there is no relevant technical solution.

SUMMARY

According to a first aspect of the disclosure, a method for communication is provided. The method includes: providing by a radio access network (RAN), a parameter of whether access is allowed to a first-type UE.

According to a second aspect of the disclosure, a method for communication is provided. The method includes: in response to a first-type UE failing to listen to a master information block (MIB) or listening to a cell bar identity in the MIB being cell barred, performing cell reselection according to a cell reselection mode of a second-type UE or according to a set mode.

According to a third aspect of the disclosure, a first-type UE is provided, which includes a processor, a transceiver, a memory, and an executable program stored on the memory and capable of being run by the processor. The processor is configured to: in response to the first-type UE failing to listen to a master information block (MIB) or listening to a cell bar identity in the MIB being cell barred, perform cell reselection according to a cell reselection mode of a second-type UE or according to a set mode.

BRIEF DESCRIPTION OF THE DRAWINGS

The accompanying drawings, which are incorporated in and constitute a part of this specification, illustrate embodiments consistent with the disclosure and together with the specification serve to explain principles of the embodiments of the disclosure.

FIG. 1 is a structural schematic diagram illustrating a wireless communication system according to an exemplary embodiment.

FIG. 2 is a schematic flowchart illustrating a method for communication applied to a radio access network (RAN) device according to an exemplary embodiment.

FIG. 3 is a schematic flowchart illustrating a method for communication applied to a user equipment (UE) according to an exemplary embodiment.

FIG. 4 is a schematic diagram illustrating a composition and structure of an apparatus for communication applied to a RAN device according to an exemplary embodiment.

FIG. 5 is a schematic diagram illustrating a composition and structure of an apparatus applied to a first-type UE for communication according to an exemplary embodiment.

DETAILED DESCRIPTION

Figures 6, 7:
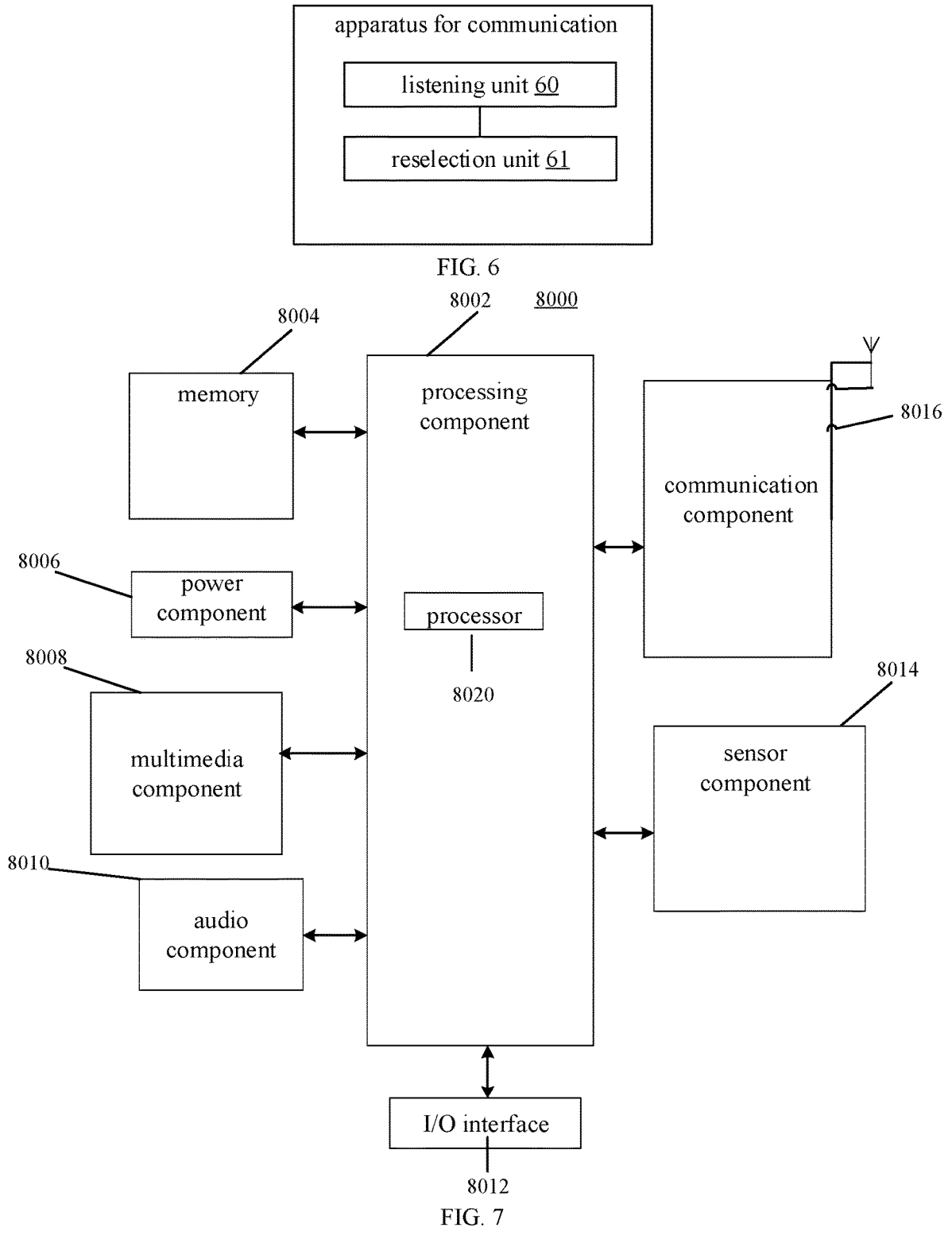
FIG. 6 is a schematic diagram illustrating a composition and structure of an apparatus applied to a second-type UE for communication according to an exemplary embodiment.
FIG. 7 is a schematic diagram illustrating a composition and structure of a UE according to an exemplary embodiment.

Exemplary embodiments will be described in detail herein, examples of which are illustrated in the accompanying drawings. Where the following description refers to the drawings, the same numerals in different drawings refer to the same or similar elements unless otherwise indicated. The implementations described in the following exemplary embodiments do not represent all implementations consistent with the embodiments of the disclosure. Rather, they are merely examples of apparatuses and methods consistent with some aspects of the embodiments of the disclosure, as recited in the appended claims.

Terms used in the embodiments of the disclosure are for the purpose of describing specific embodiments only, and are not intended to limit the embodiments of the disclosure. As used in the examples of the disclosure and the appended claims, the singular forms "a/an", "the" and "said" are also intended to include the plural forms unless the context clearly dictates otherwise. It should also be understood that the term "and/or" as used herein refers to and includes any and all possible combinations of one or more of the associated listed items.

It should be understood that although the embodiments of the disclosure may use the terms first, second, third, etc. to describe various information, the information should not be limited to these terms. These terms are only used to distinguish information of the same type from one another. For example, without departing from the scope of the embodiments of the disclosure, first information may also be called second information, and similarly, the second information may also be called the first information. Depending on the context, the word "if" as used herein may be interpreted as "in case that" or "when" or "in response to determining"

Referring to FIG. 1, it shows a structural schematic diagram of a wireless communication system according to an embodiment of the disclosure. As shown in FIG. 1, the wireless communication system is a communication system based on cellular mobile communication technology, and the wireless communication system may include: several UEs 11 and several base stations 12.

The UE 11 may be a device that provides voice and/or data connectivity to a user. The UE 11 may communicate with one or more core networks via a radio access network (RAN), and the UE 11 may be an Internet of Things (IoT)

UE, such as a sensor device, a mobile phone (or called a "cellular" phone) and a computer with the IoT-UE. For example, the UE 11 may be a fixed, portable, pocket, hand-held, built-in or vehicle-mounted device. For example, the UE 11 may be a station (STA), a subscriber unit, a subscriber station, a mobile station, a mobile, a remote station, an access point, a remote terminal, an access terminal, a user terminal, a user agent, a user device, or user equipment (UE). Alternatively, the UE 11 may also be a device of an unmanned aerial vehicle. Alternatively, the UE 11 may also be a vehicle-mounted device, for example, it may be an electronic control unit (ECU) with a wireless communication function, or a wireless communication device connected externally to the ECU. Alternatively, the UE 11 may also be a roadside device, for example, it may be a street lamp, a signal lamp, or other roadside devices with a wireless communication function.

The base station 12 may be a network-side device in a wireless communication system. The wireless communication system may be the 4th generation mobile communication (4G) system, also known as a long term evolution (LTE) system. Alternatively, the wireless communication system may also be a 5G system, also known as new radio (NR) system or 5G NR system. Alternatively, the wireless communication system may also be any generation system of the 5G. The access network in the 5G system may be called a new generation-radio access network (NG-RAN). Alternatively, it is a machine-type communication (MTC) system.

The base station 12 may be an evolved base station (eNB) used in the 4G system. Alternatively, the base station 12 may also be a base station (gNB) that adopts a centralized distributed architecture in a 5G system. When the base station 12 adopts the centralized distributed architecture, it usually includes a central unit (CU) and at least two distributed units (DUs). The CU is provided with protocol stacks of a packet data convergence protocol (PDCP) layer, a radio link control (RLC) protocol layer, and a medium access control (MAC) layer. The DU is provided with a protocol stack of a physical (PHY) layer. The specific implementation of the base station 12 is not limited in this embodiment of the disclosure.

A wireless connection may be established between the base station 12 and the UE 11 through a wireless air interface. In different embodiments, the wireless air interface is a wireless air interface based on the fourth generation mobile communication network technology (4G) standard or a wireless air interface based on the fifth generation mobile communication network technology (5G) standard. For example, the wireless air interface is a new air interface. Alternatively, the wireless air interface may also be a wireless air interface based on a 5G next-generation mobile communication network technology standard.

In some embodiments, an end-to-end (E2E) connection may also be established between the UEs 11, for example, vehicle-to-vehicle (V2V) communication, vehicle to infrastructure (V2I) communication and vehicle to pedestrian (V2P) communication and other communication scenes in vehicle-to-everything (V2X) communication.

In some embodiments, the above wireless communication system may further include a network management device 13.

Several base stations 12 are respectively connected to the network management device 13. The network management device 13 may be a core network device in a wireless communication system. For example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF) or a home subscriber server (HSS), etc. The implementation of the network management device 13 is not limited in this embodiment of the disclosure.

The execution bodies involved in the embodiments of the disclosure include, but are not limited to: a UE in a cellular mobile communication system, a base station in the cellular mobile communication system, and the like.

FIG. 2 is a schematic flowchart illustrating a method for communication according to an exemplary embodiment. As shown in FIG. 2, the method for communication in this embodiment of the disclosure is applied to a radio access network (RAN) side, and the method for communication includes the following processing steps.

At 201, the RAN provides a parameter of whether access is allowed to a first-type UE.

Specifically, the RAN provides the parameter of whether access is allowed to the first-type UE through a system information block (SIB) SIB1. Here, the first-type UE mainly refers to a reduced capability (Redcap) UE, that is, an energy-saving UE.

The RAN mainly refers to access network elements related to the access network, such as base stations, relay stations, and radio remote units.

As an implementation, the RAN sends first indication information to the first-type UE through the SIB1, and sends second indication information through a master information block (MIB). The first indication information and the second indication information are configured to jointly indicate whether the first-type UE is allowed to access. The cellbar parameter in the current MIB is obtained. If a value of the cellbar is barred, it is considered as being unable to access (i.e., cell barred); otherwise, it is considered as cell allowed, and continue to obtain the identity "cellbar_Redcap" in the SIB1 to indicate whether a Redcap user is accessed, for further judgment on indicating whether a specific type UE is allowed to access.

In the embodiment of the disclosure, the parameter in the SIB1 indicating whether to allow access provided by the RAN for a specific type UE may be optionally configured. That is, the parameter indicating to allow or bar access of the specific type UE is set or not set in the SIB1 according to needs. As mentioned above, when the parameter of allowing or barring access of the specific type UE is not set, the cellbar parameter in the MIB may be used to indicate whether the specific type UE is allowed to access a current cell.

As an implementation, the parameter in the SIB1 indicating whether to allow access provided by the RAN for the specific type UE is allowing the specific type UE to access or not to access, that is, cell allowed/cell barred or not barred/barred. In an embodiment, for a non-specific type UE, the following fields may be added to the protocol when per PLMN configuration is needed:

```
PLMN-IdentityInfoList ::=    SEQUENCE (SIZE (1..maxPLMN)) OF PLMN-IdentityInfo
PLMN-IdentityInfo ::=        SEQUENCE {
    plmn-IdentityList            SEQUENCE (SIZE (1..maxPLMN)) OF PLMN-Identity,
    trackingAreaCode         TrackingAreaCode                         OPTIONAL,
```

-continued

```
-- Need R
  ranac              RAN-AreaCode                                    OPTIONAL,
-- Need R
  cellIdentity           CellIdentity,
  cellReservedForOperatorUse    ENUMERATED {reserved, notReserved},
  ...,
  [[
iab-Support-r16        ENUMERATED {true}                         OPTIONAL
-- Need S
]],
    [[
cellBarred-Redcap        ENUMERATED {barred, notBarred},  OPTIONAL
-- Need S
]]
}.
```

The parameter in the SIB1 indicating whether to allow access provided by the RAN for the specific type UE has the following possibilities: optional, no configuration exists; or configuration exists.

The specific type UE is allowed or not allowed to access (i.e., cell allowed/cell barred), and at this time, the non-specific type UE is unrestricted to access if it is allowed to access;

When it is reserved for the specific type UE and allowed to access (i.e., Cell reserved for Redcap), the non-specific type UE is restricted to access;

When it is reserved for the non-specific UE and allowed to access (i.e., Cell reserved for legacy), the specific type UE is restricted to access;

When it is reserved for an operator to use (i.e., Cell reserved for operator), the non-specific type UE and/or the specific type US are restricted to access.

As an implementation, the second indication information is configured to indicate that access is not allowed (Barred or cell barred), indicating that access is not allowed for the first-type UE; and the second indication information indicates that that access is allowed (notBarred or cell allowed), indicating that access is allowed for the first-type UE.

Alternatively, as an implementation, the parameter in the SIB1 of whether access is allowed, is configured to indicate the first-type UE is allowed to access and indicate a second-type UE is allowed or barred to access. The second-type UE is different from the first-type UE. For example, the second-type UE may be a common UE different from the Redcap UE. Specifically, configuring the parameter in the SIB1 of whether access is allowed, to indicate the second-type UE is allowed or barred to access includes: configuring the parameter in the SIB1 of whether access is allowed, to indicate the second-type UE is barred to access; or configuring the parameter in the SIB1 of whether access is allowed, to indicate a part of second-type UEs are allowed to access; or configuring the parameter in the SIB1 of whether access is allowed, to indicate second-type UEs with a part of access identities allowed to access; or configuring the parameter in the SIB1 of whether access is allowed, to indicate second-type UEs with a part of access categories (AC) are allowed to access; or configuring the parameter in the SIB1 of whether access is allowed, to indicate second-type UEs with a part of call types or call establishment reasons are allowed to access.

The parameter in the SIB1 of whether access is allowed is configured to indicate the second-type UE is allowed to access, and is configured to indicate that the first-type UE is allowed or barred to access.

As an implementation, configuring the parameter in the SIB1 of whether access is allowed, to indicate the first-type UE is allowed or barred to access, includes:

configuring the parameter in the SIB1 of whether access is allowed, to indicate the first-type UE is barred to access; or configuring the parameter in the SIB1 of whether access is allowed, to indicate a part of first-type UEs are allowed to access;

configuring the parameter in the SIB1 of whether access is allowed, to indicate first-type UEs with a part of access identities are allowed to access; or configuring the parameter in the SIB1 of whether access is allowed, to indicate first-type UEs with a part of AC are allowed to access; or configuring the parameter in the SIB1 of whether access is allowed, to indicate first-type UEs with a part of call types or some call establishment reasons are allowed to access.

As another implementation, in the embodiment of the disclosure, the parameter in the SIB1 of whether access is allowed is served as a resource reserved for an operator to indicate the first-type UE and/or the second-type UE are allowed or barred to access. Cell reserved for operator has the same access restrictions for the second-type UE and the first-type UE.

As an embodiment, for the non-specific type UEs and/or specific type UEs, only a part of UEs may be allowed. The specific type UEs mainly refer to Redcap UEs, and the non-specific type UEs refer to common UEs other than the Redcap UEs. As an embodiment, for the non-specific type UEs and/or specific type UEs, only a part of UEs with access identities may be allowed to access the cell (i.e., cell allowed). For example, operator-related access identities may be used, and only UEs with network identities of their operators are allowed to access the cell. As an embodiment, for the non-specific type UEs and/or specific type UEs, only UEs with some AC are allowed to access the cell (i.e., cell allowed). As an embodiment, for the non-specific type UEs and/or specific type UEs, only UEs with a part of call types or call establishment reasons are allowed to access the cell (i.e., cell allowed), such as emergency calls.

As another implementation, Cell reserved for operator only has different constraints on legacy/redcap. Specifically, as an embodiment, only legacy users (i.e., the second-type UEs) are restricted to access, while redcap users (i.e., the first-type UEs) are unrestricted to access. As an embodiment, for the non-specific type UEs and/or specific type UEs, configuration of access restrictions is different. For example, taking access identities as an example, the legacy users with x-type and y-type access identities of are restricted to access, and the Redcap users with z-type access identities are restricted to access.

As an embodiment, the Redcap user may reuse an original identity reserved for an operator (Cell reserved for operator) to indicate whether access restriction needs to be performed on the Redcap.

As an embodiment, the disclosure may also add a new identity reserved for an operator (Cell reserved for operator) on the basis of the existing protocol to indicate whether access restriction needs to be performed on the Redcap.

The following specific examples are described for the parameter of whether access is allowed, provided by the above-mentioned RAN to the specific type UEs and/or non-specific type UEs, which include.

The parameter in the SIB1 indicating whether to allow access provided by the RAN for the specific type UE is reserving for the non-specific UE and allowing to access (i.e., Cell reserved for legacy), then there is a need to further judge for the non-specific type UE (the judgment result is cell allowed or cell barred). As an embodiment, the non-specific type UE is not allowed to access (i.e., cell barred). As an embodiment, for the non-specific type UEs, only some users may be allowed to access. As an embodiment, for the non-specific type UEs, only a part of access identities are allowed to access the cell (i.e., cell allowed), such as operator-related access identities. As an embodiment, for the non-specific type UEs, only a part of access categories are allowed to access the cell (i.e., cell allowed). As an embodiment, for the non-specific type UEs, only a part of call types or call establishment reasons are allowed to access the cell (i.e., cell allowed), such as emergency calls.

The parameter in the SIB1 indicating whether to allow access provided by the RAN for the specific type UE is reserving for the non-specific type UE and allowing to access (i.e., Cell reserved for legacy), then a judgment status of the non-specific type UE is cell allowed, while there is a need to further judge for the specific type UE (the judgment result is cell allowed or cell barred). As an embodiment, the specific type UE is not allowed to access (i.e., cell barred). As an embodiment, for the specific type UEs, only some ment reasons are allowed to access the cell (i.e., cell allowed), such as emergency calls.

The parameter in the SIB1 provided by the RAN for the non-specific type UE indicating whether access is allowed is reserving for an operator to use (i.e., Cell reserved for operator), then there is a need to further judge for the specific type UEs and the non-specific type UEs (the judgment result is cell allowed or cell barred). Specifically, it includes the following two modes.

Mode 1: Cell reserved for operator has the same constraints on legacy UEs and Redcap UEs. As an embodiment, for the non-specific type UEs and/or the specific type UEs, only some users may be allowed to access. As an embodiment, for the non-specific type UEs and/or the specific type UEs, only a part of access identities are allowed to access the cell (cell allowed), such as operator-related access identities. As an embodiment, for the non-specific type UEs and/or the specific type UEs, only a part of access categories are allowed to access the cell (cell allowed). As an embodiment, for the non-specific type UEs and/or the specific type UEs, only a part of call types or call establishment reasons are allowed to access the cell (cell allowed), such as emergency calls.

Mode 2: Cell reserved for operator only has different constraints on legacy/redcap. As an embodiment, according to the above-mentioned restrictions, only legacy users are restricted to access, while redcap users are unrestricted to access. As an embodiment, for the non-specific type UEs and/or the specific type UEs, configuration of access restrictions is different according to the above-mentioned restrictions. For example, taking access identities as an example, the legacy users with x-type and y-type access identities of are restricted to access, and the Redcap users with z-type access identities are restricted to access. As an embodiment, an identity indicating whether access restriction needs to be performed on the Redcap may be added based on the existing protocol.

In the embodiment of the disclosure, the RAN provides a parameter in the SIB1 to indicate whether access is allowed for a specific type UE, and the specific configuration is as follows:

```
PLMN-IdentityInfoList ::=          SEQUENCE (SIZE (1..maxPLMN)) OF PLMN-IdentityInfo
PLMN-IdentityInfo ::=              SEQUENCE {
    plmn-IdentityList                  SEQUENCE (SIZE (1..maxPLMN)) OF PLMN-Identity,
    trackingAreaCode                       TrackingAreaCode
OPTIONAL,              -- Need R
    ranac                                  RAN-AreaCode
OPTIONAL,              -- Need R
    cellIdentity                       CellIdentity,
    cellReservedForOperatorUse          ENUMERATED {reserved, notReserved},
    ...,
    [[
iab-Support-r16                            ENUMERATED   {true}
OPTIONAL              -- Need S
]],
    [[
cellReservedForOperatorUse-Redcap          ENUMERATED {reserved, notReserved},
]]
}
``` users may be allowed to access. As an embodiment, for the specific type UEs, only a part of access identities are allowed to access the cell (i.e., cell allowed), such as operator-related access identities. As an embodiment, for the specific type UEs, only a part of access categories are allowed to access the cell (i.e., cell allowed). As an embodiment, for the specific type UEs, only a part of call types or call establish- In the embodiment of the disclosure, the RAN may also provide a configuration in the SIB1 for the specific type UE to indicate a cell reselection identity. This configuration is an optional configuration, which is used for the specific type UE to determine whether intra-frequency cell reselection is allowed after it is judged to be cell barred.

FIG. 3 is a schematic flowchart illustrating a method for communication according to an exemplary embodiment. As shown in FIG. 3, the method for communication in this embodiment of the disclosure is applied to a first-type UE, and the method for communication includes the following processing steps.

At 301, a first-type UE fails to listen to a master information block (MIB) listens to a cell bar identity in the MIB being cell barred, and the first-type UE performs cell reselection according to a cell reselection mode of a second-type UE or according to a set mode.

As an implementation, when the first-type UE fails to listen to SIB1, it is determined that access to a cell is barred, and cell reselection is performed according to the cell reselection mode of the second-type UE or according to the set mode.

As an implementation, the first-type UE listens to a SIB1 and does not support a configuration in the SIB1, it is determined that access to the cell is barred and cell reselection is performed according to the cell reselection mode of the second-type UE or according to the set mode or according to a reselection mode configured in the SIB1.

As an implementation, when the first-type UE listens to a SIB1, it is determined that access to the cell is barred, based on a parameter in the SIB1 of whether access is allowed, and cell reselection is performed according to the cell reselection mode of the second-type UE or according to the set mode or according to a reselection mode configured in the SIB1.

As an implementation, when the second-type UE listens to a SIB1, it is determined that access to the cell is barred based on a parameter in the SIB1 of whether access is allowed, and cell reselection is performed according to a cell reselection mode indicated by the MIB or according to the set mode.

In the embodiment of the disclosure, the RAN may also provide a configuration in the SIB1 for the specific type UE (Redcap UE) to indicate a cell reselection identity. This configuration is an optional configuration, which is used for the specific type UE to determine whether intra-frequency cell reselection is allowed after it is judged to be cell barred. Specifically, when cell barred is obtained or the MIB cannot be obtained after the specific type UE reads the cell bar identity in the MIB, it is considered cellbar. At this time, the cell reselection behavior is as follows.

As an embodiment, a cell reselection behavior for the specific type UE is consistent with that for the non-specific type UE (i.e., following a protocol agreement mode used by legacy users);

As an embodiment, the cell reselection behavior for the specific type UE may be performing cell reselection in accordance with a pre-agreed mode (e.g., a way of a protocol or hardcode written into the UE), that is, intra-frequency cell reselection is allowed or not allowed.

When the specific type UE cannot obtain the SIB1, it is considered cellbar, the cell reselection behavior is as follows: as an embodiment, the cell reselection behavior for the specific type UE is consistent with that for a non-specific type UE (i.e., following an identity in the MIB used by legacy users); as an embodiment, the cell reselection behavior for the specific type UE is performing cell reselection in accordance with a pre-agreed mode (e.g., a protocol or hardcode way), that is, intra-frequency cell reselection is allowed or not allowed.

After the specific type UE obtains the SIB1, it is considered cellbar when the specific type UE does not support a configuration in the SIB1. At this time, the cell reselection behavior is as follows: as an embodiment, after the specific type UE obtains the SIB1, it is considered cellbar when the specific type UE does not support initial uplink and downlink bandwidth part (BWP) configurations in the SIB1; as an embodiment, the cell reselection behavior for the specific type UE is consistent with that for the non-specific type UE, that is, according to the existing cell reselection switch intraFreqReselection in the MIB; as an embodiment, the cell reselection behavior for the specific type UE is performing cell reselection in accordance with a pre-agreed mode (e.g., a protocol or hardcode way), that is, intra-frequency cell reselection is allowed or not allowed; as an embodiment, the cell reselection behavior for the specific type UE is performing cell reselection in accordance with a cell reselection identity configured for the specific type UE in the SIB1 (if configured). If the cell reselection identity/flag is not configured, the cell reselection behavior for the specific type UE is consistent with that for the non-specific type UE, or cell reselection is performed in a pre-agreed mode such as a protocol or a hardcode way.

When the specific type UE obtains the SIB1 and determines that access to the cell is barred, the cell reselection behavior at this time is as follows:

As an embodiment, the cell reselection behavior for the specific type UE is consistent with that for the non-specific type UE, that is, according to the existing cell reselection switch intraFreqReselection in the MIB. As an embodiment, the cell reselection behavior for the specific type UE is performing cell reselection according to a pre-agreed mode such as a protocol or hardcode way, that is, intra-frequency cell reselection is allowed or not allowed. As an embodiment, the cell reselection behavior for the specific type UE is performing cell reselection according to a cell reselection identity configured for the specific type UE configured in the SIB1 (if configured). When there is no configuration in the parameter, the cell reselection behavior is performing cell reselection according to a pre-agreed mode such as a protocol or hardcode way, or cell reselection is performed according to the cell reselection identity configured for the specific type UE configured in the SIB1.

When the non-specific type UE obtains the SIB1 and determines that access to the cell is barred, the cell reselection behavior is as follows: as an embodiment, for the non-specific type UE, the cell reselection is performed according to the existing cell reselection switch (intraFreqReselection) in the MIB; as an embodiment, the cell reselection behavior for the non-specific type UE is performing cell reselection in accordance with a pre-agreed mode such as a protocol or a hardcode way, that is, intra-frequency cell reselection is allowed or not allowed.

FIG. 4 is a schematic diagram illustrating a composition and structure of an apparatus for communication according to an exemplary embodiment. As shown in FIG. 4, the apparatus for communication in this embodiment of the disclosure includes a providing unit 40.

The providing unit 40 is configured to provide a parameter of whether access is allowed to a first-type UE.

In some embodiments, the providing unit 40 provides the parameter of whether access is allowed to the first-type UE through a SIB1.

On the basis of the apparatus for communication shown in FIG. 4, the apparatus in the embodiment of the disclosure further includes a sending unit (not shown in FIG. 4).

The sending unit is configured to send first indication information to the first-type UE through a SIB1, and send second indication information through a MIB. The first indication information and the second indication information are configured to jointly indicate whether the first-type UE is allowed to access.

In some embodiments, the second indication information indicates that access is not allowed, indicating that access is not allowed for the first-type UE; the second indication information indicates that access is allowed, indicating that access is allowed for the first-type UE.

In some embodiments, the parameter in the SIB1 of whether access is allowed is configured to indicate the first-type UE is allowed to access and is configured to indicate a second-type UE is allowed or barred to access. The second-type UE is different from the first-type UE.

In some embodiments, the parameter in the SIB1 of whether access is allowed is configured to indicate the second-type UE is barred to access; or the parameter in the SIB1 of whether access is allowed is configured to indicate a part of second-type UEs are allowed to access; or the parameter in the SIB1 of whether access is allowed is configured to indicate second-type UEs with a part of access identities are allowed to access; or the parameter in the SIB1 of whether access is allowed is configured to indicate second-type UEs with a part of access categories are allowed to access; or the parameter in the SIB1 of whether access is allowed is configured to indicate second-type UEs with a part of call types or call establishment reasons are allowed to access.

In some embodiments, the parameter in the SIB1 of whether access is allowed is configured to indicate the second-type UE is allowed to access, and is configured to indicate the first-type UE is allowed or barred to access In some embodiments, the parameter of whether to allow access in the SIB1 is configured to indicate the first-type UE is barred to access; or the parameter in the SIB1 of whether access is allowed is configured to indicate a part of first-type UEs are allowed to access; or the parameter in the SIB1 of whether access is allowed is configured to indicate first-type UEs with a part of access identities are allowed to access; or the parameter in the SIB1 of whether access is allowed is configured to indicate first-type UEs with a part of access categories are allowed to access; or the parameter in the SIB1 of whether access is allowed is configured to indicate first-type UEs with a part of call types or call establishment reasons are allowed to access.

In some embodiments, the parameter in the SIB1 of whether access is allowed is served as a resource reserved for operators to indicate the first-type UE and/or the second-type UE are allowed or barred to access.

In some embodiments, the providing unit 40 is further configured to: provide the parameter of whether access is allowed to the first-type UE in an optional configuration.

In some embodiments, the SIB1 is further provided with identity information for indicating the first-type UE to perform cell reselection, and the identity information is configured to indicate whether to allow the first-type UE to perform an intra-frequency cell reselection after the first-type UE is barred to access.

In an exemplary embodiment, the providing unit 40, the sending unit, etc. may be implemented by one or more central processing units (CPUs), graphics processing units (GPUs), baseband processors (BPs), an application specific integrated circuit (ASIC), a digital signal processor (DSP), a programmable logic device (PLD), a complex programmable logic device (CPLD), a field-programmable gate array (FPGA), a general-purpose processor, a controller, a micro controller unit (MCU), a microprocessor, or other electronic elements, may also be implemented in combination with one or more radio frequency (RF) antennas, to execute the method for communication in the foregoing embodiments.

In the embodiment of the disclosure, the specific manner of performing operations by each unit in the apparatus for communication shown in FIG. 4 has been described in detail in the embodiment of the method, which may not be described in detail here.

FIG. 5 is a schematic diagram illustrating a composition and structure of an apparatus for communication according to an exemplary embodiment. As shown in FIG. 5, the apparatus for communication in this embodiment of the disclosure is applied to a first-type UE, and the apparatus includes a listening unit 50 and a reselection unit 51.

The listening unit 50 is configured to listen to a MIB or listen to a cell bar identity in the MIB.

The reselection unit 51 is configured to in response to failing to listen to the MIB or the cell bar identity in the MIB being cell barred, perform cell reselection according to a cell reselection mode of a second-type UE or according to a set mode.

In some embodiments, the reselection unit 51 is further configured to: when the listening unit 50 fails to listen to a SIB1, determine access to a cell is barred, and perform cell reselection according to the cell reselection mode of the second-type UE or according to the set mode.

In some embodiments, when the listening unit 50 listens to the SIB1 and does not support a configuration in the SIB1, the reselection unit 51 determines access to the cell is barred and performs cell reselection according to the cell reselection mode of the second-type UE or according to the set mode or according to a reselection mode configured in the SIB1.

In some embodiments, when the listening unit 50 listens to the SIB1, the reselecting unit 51 determines that access to the cell is barred based on a parameter in the SIB1 of whether access is allowed, and performs cell reselection according to the cell reselection mode of the second-type UE or according to the set mode or according to a reselection mode configured in the SIB1.

In an exemplary embodiment, the listening unit 50, the reselection unit 51, etc. may be implemented by one or more central processing units (CPUs), graphics processing units (GPUs), baseband processors (BPs), an application specific integrated circuit (ASIC), a digital signal processor (DSP), a programmable logic device (PLD), a complex programmable logic device (CPLD), a field-programmable gate array (FPGA), a general-purpose processor, a controller, a micro controller unit (MCU), a microprocessor, or other electronic elements, may also be implemented in combination with one or more radio frequency (RF) antennas, to execute the method for communication in the foregoing embodiments.

In the embodiment of the disclosure, the specific manner of performing operations by each unit in the apparatus for communication shown in FIG. 5 has been described in detail in the embodiment of the method, which may not be described in detail here.

FIG. 6 is a schematic diagram illustrating a composition and structure of an apparatus for communication according to an exemplary embodiment. As shown in FIG. 6, the apparatus for communication in this embodiment of the disclosure is applied to a second-type UE, and the apparatus includes a listening unit 60 and a reselection unit 61.

The listening unit 60 is configured to listen to a SIB1.

The reselection unit 61 is configured to determine access to the cell is barred, based on a parameter in the SIB1 of whether access is allowed and perform cell reselection according to a cell reselection mode indicated by the MIB or according to the set mode.

In an exemplary embodiment, the listening unit 60, the reselection unit 61, etc. may be implemented by one or more central processing units (CPUs), graphics processing units (GPUs), baseband processors (BPs), an application specific integrated circuit (ASIC), a digital signal processor (DSP), a programmable logic device (PLD), a complex programmable logic device (CPLD), a field-programmable gate array (FPGA), a general-purpose processor, a controller, a micro controller unit (MCU), a microprocessor, or other electronic elements, may also be implemented in combination with one or more radio frequency (RF) antennas, to execute the method for communication in the foregoing embodiments.

In the embodiment of the disclosure, the specific manner of performing operations by each unit in the apparatus for communication shown in FIG. 6 has been described in detail in the embodiment of the method, which may not be described in detail here.

FIG. 7 is a block diagram illustrating a user equipment (UE) 8000 according to an exemplary embodiment. For example, the UE 8000 may be a mobile phone, a computer, a digital broadcast terminal, a messaging device, a game console, a tablet device, a medical device, a fitness device, a personal digital assistant, or the like.

Referring to FIG. 7, the UE 8000 may include one or more of the following components: a processing component 8002, a memory 8004, a power component 8006, a multimedia component 8008, an audio component 8010, an input/output (I/O) interface 8012, a sensor component 8014, and a communication component 8016.

The processing component 8002 generally controls overall operations of the UE 8000, such as the operations associated with display, phone calls, data communications, camera operations, and recording operations. The processing component 8002 may include one or more processors 8020 to execute instructions to perform all or some of the steps of the methods described above. Moreover, the processing component 8002 may include one or more modules that facilitate interactions between the processing component 8002 and other components. For example, the processing component 8002 may include a multimedia module to facilitate interactions between the multimedia component 8008 and the processing component 8002.

The memory 8004 is configured to store various types of data to support operation of the UE 8000. Examples of such data include instructions for any application or method operating on the UE 8000, contact data, phonebook data, messages, pictures, videos, and the like. The memory 8004 may be implemented by any type of volatile or nonvolatile storage device or their combination, such as a static random-access memory (SRAM), an electrically-erasable programmable read only memory (EEPROM), an erasable programmable read only memory (EPROM), a programmable read only memory (PROM), a read only memory (ROM), a magnetic memory, a flash memory, a magnetic or optical disk.

The power component 8006 provides power to various components of the UE 8000. The power component 8006 may include a power management system, one or more power sources, and any other components associated with the generation, management, and distribution of power in the UE 8000.

The multimedia component 8008 includes a screen providing an output interface between the UE 8000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 8008 includes a front-facing camera and/or a rear-facing camera. When the UE 8000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 8010 is configured to output and/or input audio signals. For example, the audio component 8010 includes a microphone (MIC for short) that is configured to receive external audio signals when the UE 8000 is in an operating mode, such as a call mode, a recording mode, and a voice recognition mode. The received audio signal may be further stored in the memory 8004 or transmitted via the communication component 8016. In some embodiments, the audio component 8010 also includes a speaker for outputting audio signals.

The I/O interface 8012 provides an interface between the processing component 8002 and peripheral interface modules, such as a keyboard, a click wheel, buttons, and the like. The buttons may include, but are not limited to, a home button, a volume button, a starting button, and a locking button.

The sensor component 8014 includes one or more sensors to provide status assessments of various aspects of the UE 8000. For instance, the sensor component 8014 may detect an open/closed status of the UE 8000, relative positioning of components, e.g., the display and the keypad, of the UE 8000, a change in position of the UE 8000 or a component of the UE 8000, a presence or absence of user contact with the UE 8000, an orientation or an acceleration/deceleration of the UE 8000, and a change in temperature of the UE 8000. The sensor component 8014 may include a proximity sensor configured to detect the presence of nearby objects without any physical contact. The sensor component 8014 may also include a light sensor, such as a complementary metal oxide semiconductor (CMOS) or a charge-coupled device (CCD) image sensor, for use in imaging applications. In some embodiments, the sensor component 8014 may also include an accelerometer sensor, a gyroscope sensor, a magnetic sensor, a pressure sensor, or a temperature sensor.

The communication component 8016 is configured to facilitate communication, wired or wirelessly, between the UE 8000 and other devices. The UE 8000 can access a wireless network based on a communication standard, such as Wi-Fi, 2G, or 3G, or their combination. In an exemplary embodiment, the communication component 8016 receives a broadcast signal or broadcast associated information from an external broadcast management system via a broadcast channel In an exemplary embodiment, the communication component 8016 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In exemplary embodiments, the UE 8000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 8004, executable by the processor 8020 in the UE 8000, for performing the above method. For example, the non-transitory computer readable storage medium may be a ROM, a random access memory (RAM), a CD-ROM, a magnetic tape, a floppy disc, an optical data storage device, and the like.

The embodiments of the disclosure also describe a network element device, including a processor, a transceiver, a memory and executable programs stored on the memory and capable of being run by the processor. When the executable programs are executed by the processor, the steps in the above method in the foregoing embodiments are implemented. The network element device may be the first network element device or the second network element device in the foregoing embodiments.

The embodiments of the disclosure also describe a UE, including a processor, a transceiver, a memory and executable programs stored on the memory and capable of being run by the processor. When the executable programs are executed by the processor, the steps in the above method in the foregoing embodiments are implemented.

The embodiments of the disclosure also describe a storage medium, having stored executable programs. When the executable programs are executed by the processor, the steps in the above method in the foregoing embodiments are implemented.

According to the method and apparatus for communication, the RAN, the UE and the storage medium in the above embodiments of the disclosure, a parameter of whether access is allowed is provided to the first-type UE (e.g., Redcap UE) and the RAN informs the parameter to the first-type UE, so that the first-type UE performs cell access or cell reselection based on the parameter. As such, the disclosure makes up the defect that there is no indication for cell access of the first-type UE (e.g., Redcap UE), facilitates the cell access and reselection of the first-type UE (e.g., Redcap UE), and facilitates communication and related applications of such first-type UE.

Those skilled in the art will be aware of other implementations of the embodiments of the disclosure after considering the specification and practicing the disclosure disclosed herein. The disclosure is intended to cover any variations, uses, or adaptive changes of the embodiments of the disclosure, which follow the general principles of the embodiments of the disclosure and include common knowledge or conventional technical means in the technical field not disclosed herein. The description and the embodiments are to be regarded as exemplary, and the true scope and spirit of the embodiments of the disclosure are indicated in the following claims.

It should be understood that the embodiments of the disclosure are not limited to the precise structures described above and illustrated in the accompanying drawings, and that various modifications and changes may be made without departing from its scope. The scope of the embodiments of the disclosure is limited only by the appended claims.

The invention claimed is:

1. A method for communication, comprising:
providing, by a radio access network (RAN), a parameter of whether access is allowed, to a first-type user equipment (UE) through a system information block SIB1, wherein the SIB1 is further provided with indication information for indicating the first-type UE to perform cell reselection, and the indication information is configured to indicate whether to allow the first-type UE to perform an intra-frequency cell reselection after the first-type UE is barred to access a cell; in a case that the SIB1 is not provided with the indication information, the first-type UE performs cell reselection according to a set mode, in which the set mode is a protocol or hardcode mode;
wherein in a case that the first-type UE acquires the SIB1 and does not support initial uplink and downlink bandwidth part configurations in the SIB1, the first-type UE determines that access to the cell is barred and performs cell reselection according to the set mode, in which the set mode is a protocol or hardcode mode; and
wherein in a case that the first-type UE fails to acquire the SIB1, the first-type UE determines that access to the cell is barred and performs cell reselection according to the set mode, in which the set mode is a protocol or hardcode mode.

2. The method of claim 1, further comprising:
sending by the RAN, first indication information to the first-type UE through the system information block SIB1, and sending second indication information through a master information block (MIB), wherein the first indication information and the second indication information are configured to jointly indicate whether the first-type UE is allowed to access.

3. The method of claim 2, wherein:
when the second indication information indicates that access is not allowed, indicating that access is not allowed for the first-type UE;
when the second indication information indicates that access is allowed, indicating that access is allowed for the first-type UE.

4. The method of claim 1, further comprising:
configuring the parameter in the SIB1 of whether access is allowed, to indicate the first-type UE is allowed to access and indicate a second-type UE is allowed or barred to access, wherein the second-type UE is different from the first-type UE.

5. The method of claim 4, wherein configuring the parameter in the SIB1 of whether access is allowed, to indicate the second-type UE is allowed or barred to access comprises:
configuring the parameter in the SIB1 of whether access is allowed, to indicate the second-type UE is barred to access; or
configuring the parameter in the SIB1 of whether access is allowed, to indicate a part of second-type UEs are allowed to access; or
configuring the parameter in the SIB1 of whether access is allowed, to indicate second-type UEs with a part of access identities are allowed to access; or
configuring the parameter in the SIB1 of whether access is allowed, to indicate second-type UEs with a part of access categories are allowed to access; or
configuring the parameter in the SIB1 of whether access is allowed, to indicate second-type UEs with a part of call types or call establishment reasons are allowed to access.

6. The method of claim 1, wherein the parameter in the SIB1 of whether access is allowed is configured to indicate a second-type UE is allowed to access, and is configured to indicate the first-type UE is allowed or barred to access.

7. The method of claim 6, wherein configuring the parameter in the SIB1 of whether access is allowed, to indicate the first-type UE is allowed or barred to access comprises:

configuring the parameter in the SIB1 of whether access is allowed, to indicate the first-type UE is barred to access; or configuring the parameter in the SIB1 of whether access is allowed, to indicate a part of first-type UEs are allowed to access;

configuring the parameter in the SIB1 of whether access is allowed, to indicate first-type UEs with a part of access identities are allowed to access; or configuring the parameter in the SIB1 of whether access is allowed, to indicate first-type UEs with a part of access categories are allowed to access; or configuring the parameter in the SIB1 of whether access is allowed, to indicate first-type UEs with a part of call types or call establishment reasons are allowed to access.

8. The method of claim 7, wherein the parameter in the SIB1 of whether access is allowed is served as a resource reserved for operators to indicate at least one of the first-type UE or the second-type UE is allowed or barred to access.

9. The method of claim 1, wherein the parameter of whether access is allowed provided by the RAN to the first-type UE is an optional configuration.

10. A method for communication, comprising:

in a case that a first-type user equipment (UE) fails to acquire a master information block (MIB) or acquire a cell bar indication in the MIB being cell barred, performing by the first-type UE, cell reselection according to a cell reselection mode of a second-type UE or according to a set mode, in which the set mode is a protocol or hardcode mode;

in a case that the first-type UE acquires the SIB1 and does not support initial uplink and downlink bandwidth part configurations in the SIB1, determining by the first-type UE, that access to a cell is barred and performing cell reselection according to the set mode, wherein the SIB1 is further provided with indication information for indicating the first-type UE to perform cell reselection, and the indication information is configured to indicate whether to allow the first-type UE to perform an intra-frequency cell reselection after the first-type UE is barred to access the cell;

in a case that the SIB 1 is not provided with the indication information, performing by the first-type UE, cell reselection according to the set mode, in which the set mode is a protocol or hardcode mode; and in a case that the first-type UE fails to acquire the SIB1, determining by the first-type UE, that access to the cell is barred and performing cell reselection according to the set mode, in which the set mode is a protocol or hardcode mode.

11. The method of claim 10, further comprising:

in a case that the first-type UE listens to the SIB1, determining that access to the cell is barred based on a parameter in the SIB1 of whether access is allowed, and performing cell reselection according to the cell reselection mode of the second-type UE or according to the set mode or according to a reselection mode configured in the SIB1.

12. The method of claim 10, further comprising:

listening to the SIB1 by the second-type UE, determining that access to the cell is barred based on a parameter in the SIB1 of whether access is allowed, and performing cell reselection according to a cell reselection mode indicated by the MIB or according to the set mode.

13. An access device, comprising: a processor, a transceiver, a memory, and an executable program stored on the memory and capable of being run by the processor, wherein when the executable program is executed by the processor, steps in the method according to claim 1 is implemented.

14. A first-type user equipment (UE), comprising: a processor, a transceiver, a memory, and an executable program stored on the memory and capable of being run by the processor, wherein the processor is configured to:

in a case that the first-type UE fails to acquire a master information block (MIB) or acquire to a cell bar indication in the MIB being cell barred, perform cell reselection according to a cell reselection mode of a second-type UE or according to a set mode, in which the set mode is a protocol or hardcode mode;

in a case that the first-type UE acquires the SIB1 and does not support initial uplink and downlink bandwidth part configurations in the SIB1, determine that access to a cell is barred and perform cell reselection according to the set mode, wherein the SIB 1 is further provided with indication information for indicating the first-type UE to perform cell reselection, and the indication information is configured to indicate whether to allow the first-type UE to perform an intra-frequency cell reselection after the first-type UE is barred to access the cell;

in a case that the SIB 1 is not provided with the indication information, perform cell reselection according to the set mode, in which the set mode is a protocol or hardcode mode; and in a case that the first-type UE fails to acquire the SIB1, determine that access to the cell is barred and perform cell reselection according to the set mode, in which the set mode is a protocol or hardcode mode.

15. A non-transitory computer readable storage medium stored with an executable program, wherein when the executable program is executed by a processor, steps in the method according to claim 1 are implemented.

* * * * *